United States Patent
Newton

[11] Patent Number: 6,016,199
[45] Date of Patent: *Jan. 18, 2000

[54] INTERFEROMETRIC DEVICE FOR PERFORMING SPECTROSCOPIC MEASUREMENTS WITH A STEPPED FABRY PEROT

[76] Inventor: William Newton, Moorkamp 57, 30165 Hanover, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/801,633

[22] PCT Filed: Aug. 24, 1995

[86] PCT No.: PCT/DE95/01130

§ 371 Date: Feb. 18, 1997

§ 102(e) Date: Feb. 18, 1997

[87] PCT Pub. No.: WO96/06335

PCT Pub. Date: Feb. 29, 1996

[30] Foreign Application Priority Data

Aug. 24, 1994 [DE] Germany ............... 44 31 412

[51] Int. Cl.[7] ........................................ G01B 9/02
[52] U.S. Cl. ............................. 356/346; 356/352
[58] Field of Search ...................... 356/352, 346

[56] References Cited

U.S. PATENT DOCUMENTS

| | | | |
|---|---|---|---|
| 4,822,998 | 4/1989 | Yokota et al. | 356/352 |
| 5,128,798 | 7/1992 | Bowen et al. | 356/352 |

FOREIGN PATENT DOCUMENTS

| | | | |
|---|---|---|---|
| 0442738 | 8/1991 | European Pat. Off. | 356/352 |
| 39 28 001 A1 | 2/1991 | Germany . | |
| 5149788 | 6/1993 | Japan | 356/352 |
| WO 85/03122 | 7/1985 | WIPO . | |

*Primary Examiner*—Samuel A. Turner
*Attorney, Agent, or Firm*—Michael J. Striker

[57] ABSTRACT

The interferometric device for performing spectroscopic measurements includes a rectangular array of interferometers, each consisting of two partially transparent parallel mirrors arranged so that a distance between the two mirrors of each interferometer is unique; an array (9) of photodetectors positioned behind the rectangular array of interferometers to produce output signals and a device for transforming these output signals to produce a spectrum. In one embodiment the interferometers are formed by two parallel plates (1,2) having the two flat surfaces (3, 4) facing away from each other and two facing surfaces (5,6) each provided with steps (11) of identical step height, but with the step height on one plate differing from the step height on the other and with the two plates (1,2) assembled together so that the steps (11) on the one plate are oriented perpendicularly to the steps (11) on the other. In another embodiment the interferometers are formed by a first parallel plate (12) having two opposing flat sides and a second parallel plate (13) having a first flat side and a second side remote from the first flat side provided with steps (17) of identical height arranged in rows between two opposing narrow sides (18, 19) so that a last step next to one narrow side in one row follows a first step in a preceding row next to the other narrow side.

13 Claims, 6 Drawing Sheets

INTERFEROMETRIC DEVICE FOR PERFORMING SPECTROSCOPIC MEASUREMENTS WITH A STEPPED FABRY PEROT

BACKGROUND OF THE INVENTION

The invention relates to a device for carrying out spectroscopic measurements by the principle of interferometry, with a matrix of photodetectors.

The current state of spectroscopy includes methods operating on the dispersive and the interferometric principles.

In the dispersive method, various dispersion agents, such as prisms and diffraction gratings (scratched or holographically etched) and in some cases wedge filters are used. The key element of this method is a spectrograph or a monochromator. A spectrograph is designed so that the entire wavelength range to be measured is detected in one step, and the complete spectrum is shown at the output. The spectrum is recorded with a photographic film, video camera, reticon or a CCD (charge coupled device). In the monochromator, light of only one wavelength at a time is delivered to the output. In order to pick up a spectrum, the prism or reflection grating is rotated, so that all the wavelengths are admitted in succession over time. For recording, a photodiode, photomultiplier, or bolometer is typically used.

In the interference method, a Michelson interferometer is often used, in which the light to be measured is carried through two partially transparent mirrors, and the spacing of the mirrors from one another is varied in order to move all the wavelengths through. The recording of the light at the output is done by means of a photodiode. The resultant course over time of the output signal of the photodiode is then subjected to a Fourier, Hadamard or similar transform, in order to obtain the spectrum.

A modified Michelson interferometer is disclosed in WO 85/03122, which makes do without a moving mirror. This is attained in that one of the mirrors is tilted, so that a two dimensional interference pattern is produced. This interference pattern is read out by means of a photodetector matrix.

From German Patent Application DE 39 28 001 A1, a multi-beam interferometer for distance measurement is known, having a monochromatic light source and one fixed and one movable mirror. One of the two mirrors has a stepped profile.

Monochromators, spectrographs and interferometers are as a rule large, expensive, and heavy and usually includes parts that have to be moved mechanically, which always entails problems with respect to accuracy. The efficiency of dispersive elements is moreover very greatly dependent on the wavelength.

SUMMARY OF THE INVENTION

The object of the invention is to create a measuring device of the type referred to at the outset which is distinguished by improved spectral measurement properties, low weight, and small dimensions, and which assures high reliability even over a relatively long period of time and a wide temperature range, and which moreover is invulnerable to even strong mechanical shaking.

This object is attained, in a measuring device of the type referred to at the outset, in accordance with the invention in which a plurality of interferometers are provided, which each comprise two partially transparent parallel mirrors and are arranged in the form of a rectangular matrix in such a way that the mirrors of all the interferometers are spaced apart by different spacings from one another, such that for each arbitrary wavelength to be measured, a plurality of reflection phase relations are present in the array, and that the different spacings are distributed uniformly between the smallest and largest spacing, and that the matrix of the photodetectors is disposed downstream of the interferometers in such a way that each interferometer is assigned at least one photodetector for receiving the light that is to be measured and that strikes the interferometer perpendicularly, and that for displaying the spectrum, a device for transforming the output signals of the matrix of photodetectors is provided.

In one embodiment the invention provides that the many interferometers are formed by two disks disposed parallel to one another, whose sides remote from one another are embodied as flat, while their sides toward one another have stairstep-like steps, the step height of the one disk differing from the step height of the other disk, and that the two disks rest on one another in such a way that the steps of the one disk extend at right angles to the steps of the other disk.

In this embodiment it is expedient if the step height on the one disk is larger than the step height on the other disk by a factor that is equal to the number of steps on the other disk. In that case,—on the condition of constant step heights on both disks—in terms of lines or rows, equal spacing increments without gaps between the lines or rows would result from one interferometer to another. Such an embodiment makes evaluation considerably easier.

The embodiment described above is not a requirement; for instance, equal spacing increments need not be present from one interferometer to another. There may also be gaps in the spacing increments. What are essential are the characteristics referred to at the outset. The characteristic that the different spacings in the region between the smallest and the largest spacing should be distributed as uniformly as possible should not be understood geometrically; that is, in exaggerated terms, a situation where there are all different spacings in the region of small spacings but no different spacings whatever in the region of large spacings, or vice versa, should be avoided. It is certainly possible for the different spacings to be distributed stochastically on the matrix. However, in that case, to enable evaluation, a table of association between the mirror spacings of the interferometers and their coordinates in the matrix must be prepared.

Another embodiment of the invention provides that the many interferometers are formed by two disks arranged parallel to one another, that both sides of the first disk are embodied as flat; that the outward-pointing side of the second disk is embodied as flat, while the other side, toward the first disk, is provided with steps of as much as possible the same height between one short side and the opposite short side, which are arranged in rows in such a way that the last step of one row on one short side is followed by the first step of the next row on the other short side.

In these embodiments, accordingly only two parts are present for forming all the interferometers, and all the wavelengths are detected in one pass. The weight of the apparatus is low, which is advantageous in all cases where weight is important, such as in aircraft, satellites, mobile measurement stations, and so forth. The three-dimensional volume is also less than in conventional spectrographs of the same capacity. Since no moving parts are necessary, the service life of the system is substantially longer, and its reliability substantially higher, than in known devices. The vulnerability to shaking and the temperature dependency are also substantially less than in known devices.

Preferably, the disks comprise glass, quartz or polymethylmethacrylate; the outward-pointing sides of the disks are provided with an antireflective coating, and the sides toward one another of the disks are coated in such a way that they form a mirror that is partially transparent for the light to be measured. It is expedient if the spacing increment between the steps amounts at most to one-quarter the wavelength of the shortest-wave light to be measured.

In a practical embodiment, 100×100 interferometers are arranged in a square matrix; the matrix of the interferometers has a total size of 10×10 mm.

It may be expedient to dispose an image amplifier between the matrix of the interferometers and the matrix of the photodetectors. This enables additional amplification of the light. By a suitable selection of the image amplifier, a chronological resolution in the nanosecond range is attainable.

BRIEF DESCRIPTION OF THE DRAWING

The objects, features and advantages of the invention will now be illustrated in more detail with the aid of the following description of the preferred embodiments, with reference to the accompanying figures in which:

FIG. 1b is detailed cutaway top view of the device of FIG. 1a;

DESCRIPTION OF THE PREFERRED EMBODIMENTS

Figure 1:
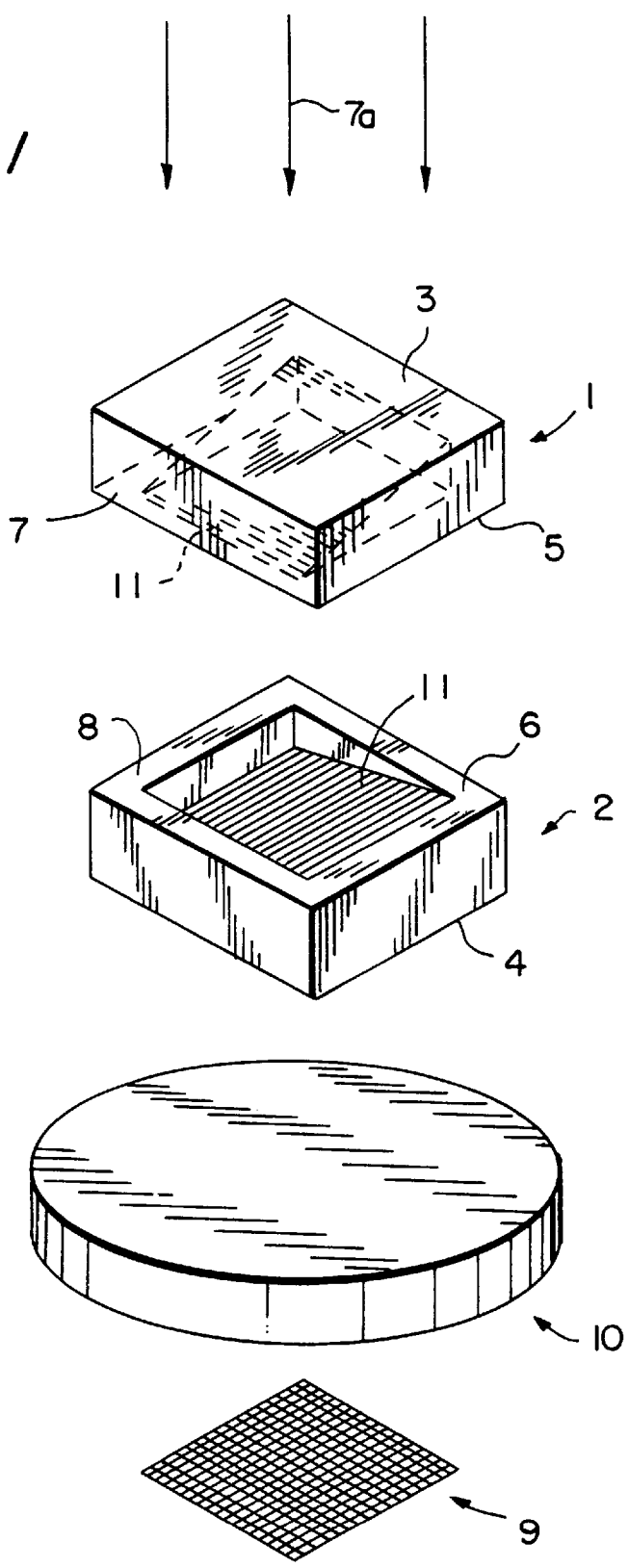
FIG. 1 is a schematic exploded perspective view of an interferometric device according to the invention for making spectroscopic measurements including two disks or plates forming an array of interferometers, an array of photodetectors and an image amplifier.
Figure 1A:
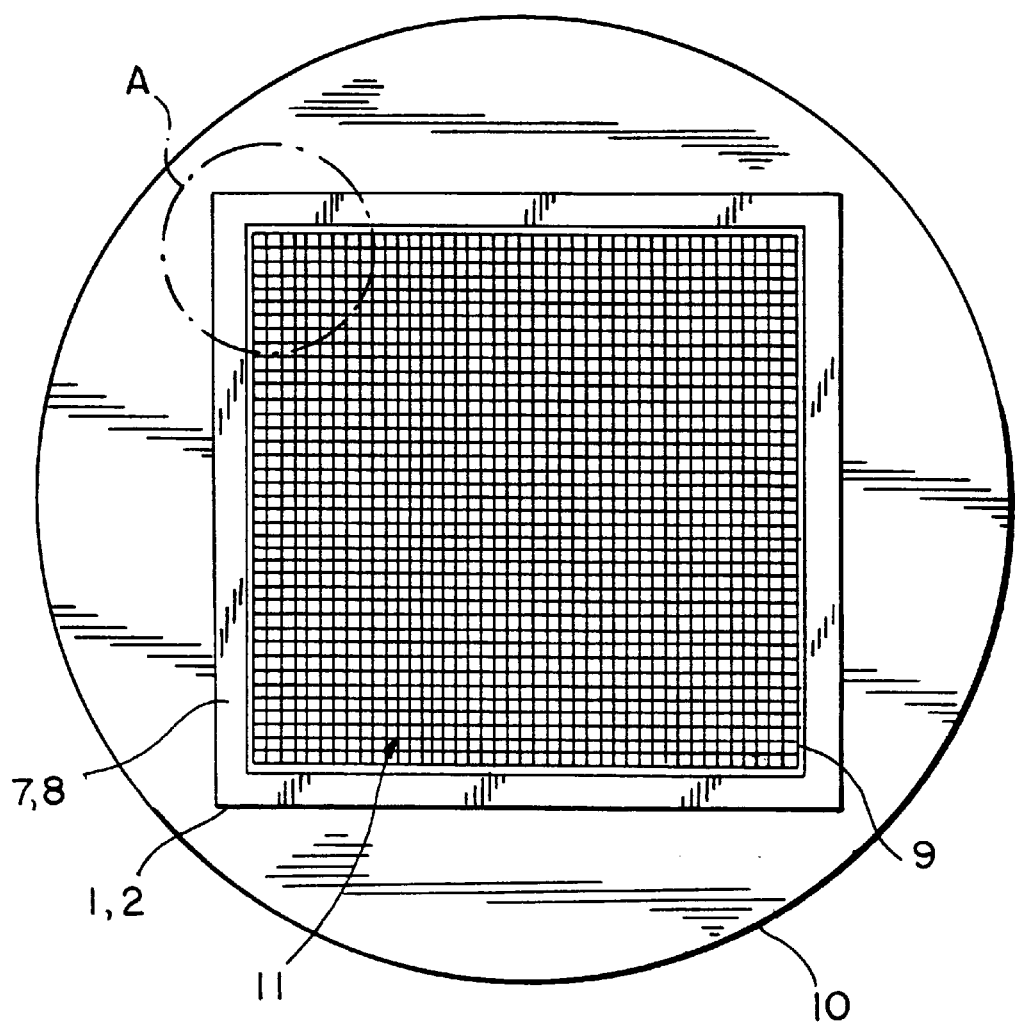
FIG. 1a is a top view of the device shown in FIG. 1.
Figure 1B:
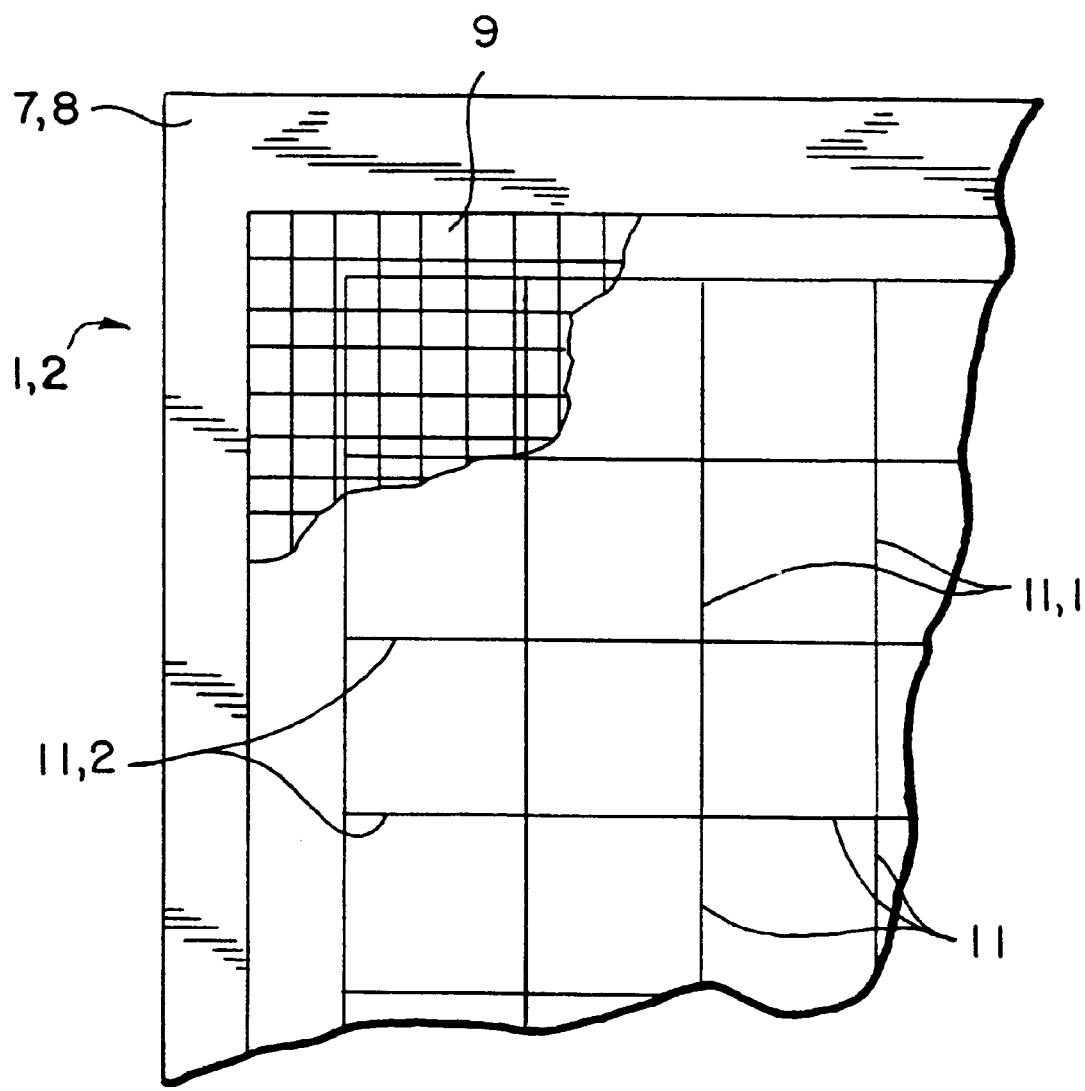

Instead of using a Michelson interferometer and scanning over time, the invention is based on a two-dimensional matrix of many interferometers. Such an arrangement is shown in FIG. 1. There, two disks 1 and 2 are provided, which are disposed parallel to one another and rest on one another; the outward-pointing sides 3 and 4 are flat, while the sides 5 and 6 toward one another drop off in stepped fashion inside an edge 7, 8. For the sake of clarity, the disks 1, 2 are shown in an exploded view. The steps of each disk have spacing increments of the same size, but the spacing increments on one disk are larger than on the other, specifically by a factor that is equal to the number of steps 11 in the other disk; the disks 1 and 2 are disposed resting on one another in such a way that the steps of the disks 1 and 2 extend at right angles to one another. The sides facing one another of the disks 1 and 2 are mirror-coated in such a way that the disks 1, 2 are partially transparent for the light to be measured. By means of the arrangement of steps 11 extending at right angles to one another, interferometers are thus formed that contain all the required spacing measurements for showing one complete interferogram. Thus each interferometer has its own constant delay. The light 7a to be analyzed, collimated, vertically at the interferometer matrix. Located downstream of the interferometers, optionally with the interposition of an image amplifier 10, is a similar matrix 9 of photodetectors, for instance a matrix of CCD detectors or CID detectors. After the desired exposure time, the detector matrix is read out. The spectrum is displayed by means of a Fourier, Hadamard or similar transform.

Figure 2A:
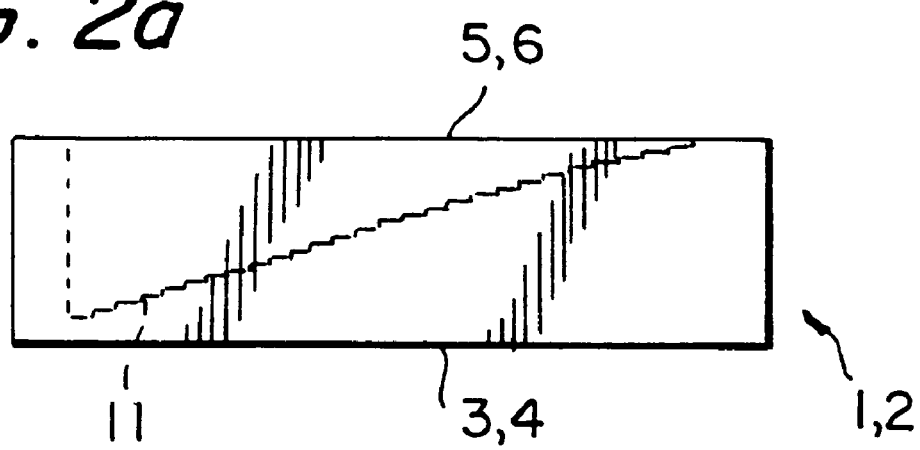
FIG. 2a is a side view of one of the disks or plates of FIG. 1.
Figure 2B:
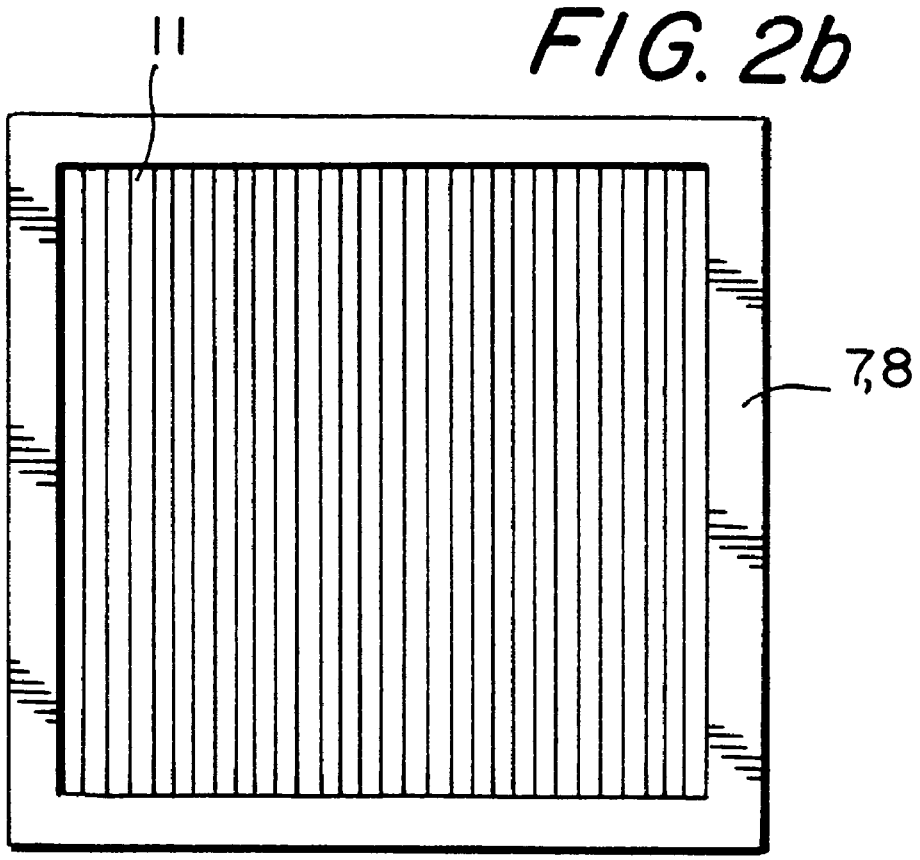
FIG. 2b is a top view of one of the disks or plates of FIG. 1.

In this exemplary embodiment, the arrangement of individual interferometers is selected such that an increasing delay occurs from one interferometer to another. The delay increments are equal and amount at most to one-quarter wavelength of the shortest-wave light to be measured. For instance, if light at 400 nm is to be detected, then the increments amount to 100 nm or less. The attainable spectral resolution is determined by the number of interferometers. If there are 10,000 interferometers with a difference of 100 nm each in terms of the delay, the resultant resolution is 0.8 nm. These 10,000 interferometers may be arranged in a matrix of 100×100. As FIG. 2 suggests, 100 steps are provided in disk 1 and also in disk 2; they have an equal spacing increment of 0.1 or 10 $\mu$m; the dimensions of the part of the disks that is provided with steps are 10 mm×10 mm, and the thickness in the stepped region is approximately 1 mm or 10 $\mu$m. For recording purposes, a square CCD detector array (such as TH 7895 M by Thomson-CF) would be suitable.

The interferometers are constructed as Fabry-Perot interferometers. The disks are arranged one on the other in such a way that the two partially reflective surfaces face one another.

Between the interferometer matrix and the detector matrix, an image amplifier 10 can also be installed which permits an additional amplification of the light. By suitable selection of an image amplifier 10, chronological resolution in the nanosecond range can be achieved.

Light that falls on a first mirror in the many interferometers is partly let through and subsequently falls on the second mirror. Since this mirror is also only partly transparent, some of the light is reflected. It then strikes the first mirror. These alternating reflections of the light produce interference. Accordingly if the light that strikes the second mirror in the first pass is in phase with the light that strikes the second mirror in the second pass, the two partial beams amplify one another. If the two partial beams are in antiphase, they cancel one another out. The phase depends on the wavelength of the light and on the spacing between the two mirrors. In contrast to the conventional FTIR (Fourier-Transform-Infrared) spectrometers, the device according to the invention includes many interferometers, each with constant and different delays. A single flash of light experiences many delays at all wavelengths simultaneously. Once the detector matrix has been read out, the spectrum can be reconstructed by means of a fast Fourier transform (or the like).

Since there are many interferometers in the matrix, it is logical to identify the individual interferometers. They all differ from one another in two characteristics: the spacing between the two partly transparent mirrors, and their positions in the matrix. The coordinates of the matrix can therefore be used as identification for the individual interferometers.

It is appropriate to use the coordinates in such a way that one three-digit number per direction identifies each individual interferometer. The first interferometer in the first row therefore has the coordinates 000, 000. The second interferometer in the first row has the coordinates 000, 001. The first interferometer in the second row has the coordinates 001, 000. In a 100×100 matrix, the last interferometer has the coordinates 099, 099.

If the matrix has 100×100 interferometers in order to measure light with a wavelength of 400 nm onward, the individual increments are 100 nm or less. If the spacing for the interferometer 000, 000 is set to 0 nm, which means that the two mirrors are in contact with one another and if the two disks 1 and 2 have a step height of 0.1 μm and 10 μm, respectively, then the following interferometers would have the following spacings (or less): 000, 001–0.1 μm; 000, 009–9.9 μm; 001,000–10 μm; 001,099–19.9 μm; 002, 000–20 μm; 099,099–999.9 μm. From this it can be seen that in a matrix structured in this way, the smallest spacing is 0.1 μm, and the largest spacing is 999.9 μm (0.999 mm0. This matrix arrangement is ideal: from one interferometer to another, the same spacing increments are present and their are no gaps; that is, no spacing increment is omitted, and the various spacings are distributed uniformly between the smallest and largest spacing.

The light to be measured strikes the matrix perpendicularly. Half the light passes through the matrix and perpendicularly strikes the two-dimensional photodetector matrix (CCD) 9. After exposure to light, the CCD matrix is read out. The readout operation for the CCD matrix is sequential. That is, the individual pixels in one row of the photodetector array are read out in chronological succession. The result means that the pixels can be read out in the precise order that corresponds to the coordinates of the interferometers. It is therefore quite easy to associate the signals from the pixels with the interferometers.

On exposure to monochromatic light of a wavelength of 800 nm, for instance, the series of signals would have a periodicity. In the numerical example used here, the period in each case would be 8 interferometers long. The period in general is calculated from the ratio between wavelength and spacing increment. The amplitude is proportional to the light intensity. In nonmonochromatic light, the periodicity would be difficult to detect. However, if all the signals are subjected to a Fourier, Walsh, Hadamard or similar transform, then the end result is the amplitude spectrum of the light.

Purely from a standpoint of measurement technology, pronounced advantages are also attainable. The spectroscopic resolution is higher than in a conventional spectrograph, scattered light performance is markedly improved with the device of the invention, and the spectral response is much more uniform. The collected (and measured) quantity of light is approximately 30%, while in a conventional spectrograph, depending on the wavelength, this value ranges between 0.1% and 60% A further advantage of the device is that it is virtually independent of the polarization of the light to be measured.

Figure 3:
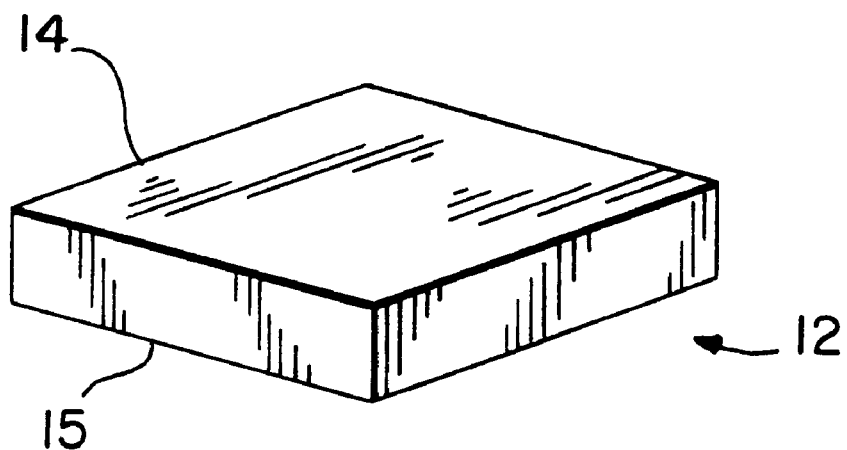
FIG. 3 is a perspective view of another embodiment of an interferometric device according to the invention for making spectroscopic measurements including two disks or plates forming an array of interferometers, an array of photodetectors and an image amplifier.
Figure 3:
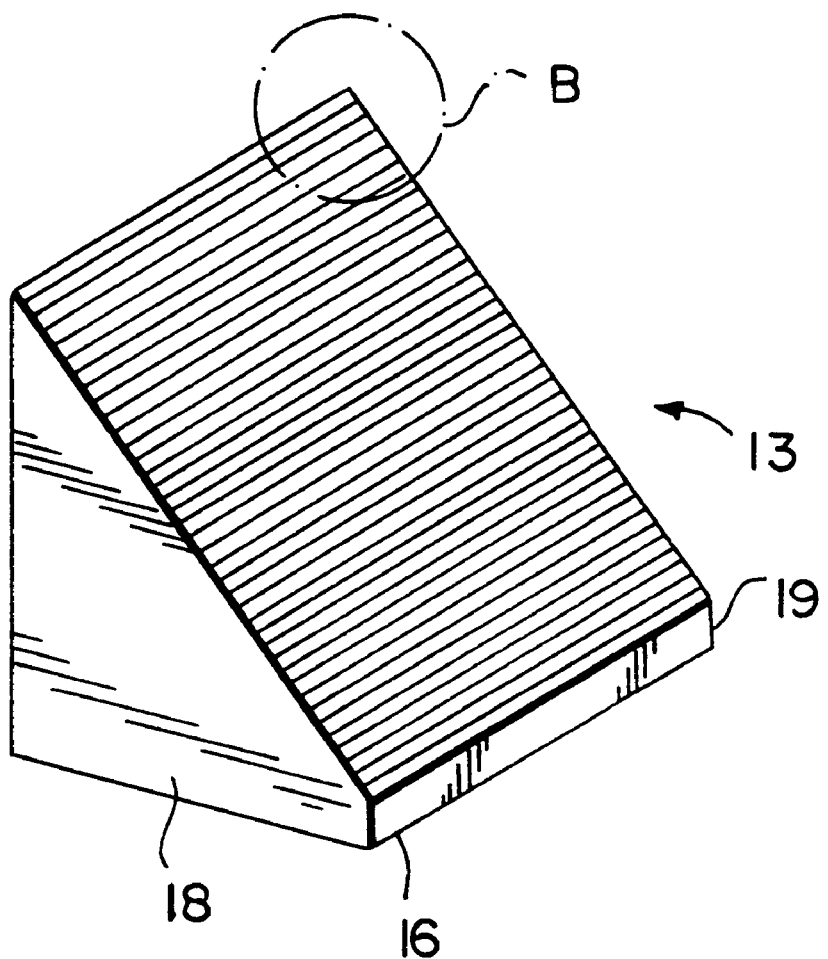
Figure 3A:
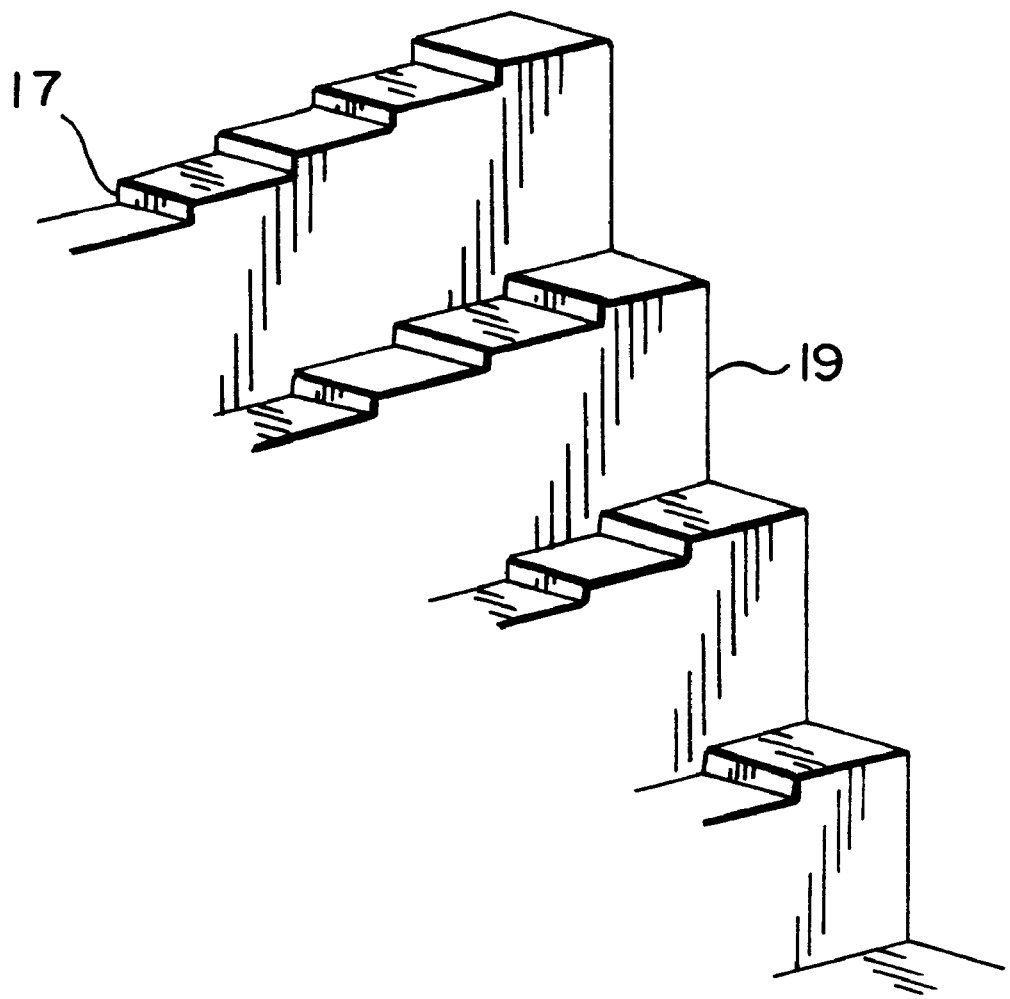
FIG. 3a is a detailed cutaway view of a portion of the disk having the steps which is located in the circle B in FIG. 3.

In the exemplary embodiment shown in FIG. 3, only the two disks 12 and 13 of the interferometer matrix are shown; for the sake of clarity, disk 13 is not shown to scale. In this exemplary embodiment, the two sides 14 and 15 of the disk 12 are flat, and all the steps 17 are placed in the disk 13, whose outward-pointing side 16 is flat. The steps 17, which face toward the flat side 15 of the disk 12, are arranged in rows between the short side 18 and the short side 19 facing it; the spacing increments from step to step are the same, as in the exemplary embodiment of FIGS. 1 and 2. The arrangement is selected such that the last step 17 of one row at the narrow side 18 is followed by the first step 17 of the next row at the short side 19. The faces of the the disks 12 and 13 that face one another are mirror-coated and partly transparent, so that each of the steps 17 together with the side 15 forms one interferometer. The top sides of the step 17 have dimensions of 0.1×0.1 mm, for instance, and 100 steps per row and 100 rows are provided, so that as in the exemplary embodiment of FIG. 1 and FIG. 2, there are 10,000 interferometers present, and the disk 13 has dimensions in the stepped region of 10×10 mm, while the thickness of the disk in the stepped region is only 1 mm. The recording of the emitter light is done as in FIGS. 1 and 2, by means of a matrix of photodetectors, not shown.

The above-described exemplary embodiments reflect ideal conditions, which however, as already noted at the outset, are not critical for an effective device. To remain with the exemplary embodiment, for instance, difficulties could arise in producing the very small graduations of 100 nm, or else different production techniques would have to be employed to produce the 100 nm and the 10 μm graduations. These problems could be circumvented if nearly the same step heights, such as 10 μm and 10.097 μm, are provided for both disks 1, 2. A matrix of that kind would also satisfy the characteristics of the main claim.

In the same way, probably-unavoidable production variations do no harm, since the interferometer matrix has to be measured anyway. In that case, one would prepare a table of the actual spacings between the pairs of mirrors and this table would be required for reconstructing the spectrum from the interferogram.

It should be noted that the figures on the number and dimensions of the interferometers given in the course of the description of the invention are provided merely as an example, and that in this respect other arrangements that are adapted to different specific applications are also possible.

I claim:

1. An interferometric device for performing spectroscopic measurements based on interferometric principles, said device comprising a plurality of interferometers, each of said interferometers consisting of two partially transparent parallel mirrors, and said interferometers being arranged in a rectangular array so that a distance between the two parallel mirrors of each of said interferometers is unique and so that a plurality of different phase relationships of reflection are present within the array for each wavelength of light (7a) to be measured;

an array (9) of photodetectors positioned behind said rectangular array of the interferometers to produce output signals from the light (7a) to be measured; and means for transforming the output signals from the photodetector array to produce a spectrum;

wherein said distances between the two mirrors of the respective interferometers are uniformly distributed within a range from a smallest distance to a largest distance, the photodetector array (9) positioned behind the rectangular array of interferometers is arranged so that at least one of the photodetectors is positioned behind each of the interferometers in order to detect the light (7a) to be measured falling perpendicularly onto each of the interferometers; and wherein the plurality of interferometers comprises two parallel plates (1,2) having two flat surfaces (3, 4) facing away from each other on different ones of the parallel plates and two facing surfaces (5,6) provided with a staircase-like series of steps (11) of a predetermined step height, the predetermined step height of each of the steps is identical on each of the plates, the predetermined step height of the steps on one of the plates (1,2) differs from the predetermined step height of the steps on the other of the plates (1,2), and the two plates (1,2) are mounted together so that the steps (11) on one plate (1,2) are oriented perpendicularly to the steps (11) on the other plate (1,2).

2. The interferometric device as defined in claim 1, wherein the step height on the one plate (1,2) is greater than the step height on the other plate (1,2) by a factor equal to a total number of the steps (11) on the other plate (1,2).

3. The interferometric device as defined in claim 1, wherein the plates (1,2) are made of glass, quartz or polymethylmethacrylate.

4. The interferometric device as defined in claim 3, wherein the two sides of said plates (1,2) facing each other are reflectively coated so that as to form partially transparent mirrors for the light (7a) to be measured.

5. The interferometric device as defined in claim 1, wherein the step height of said steps (11) is less than or equal to a quarter of a shortest wavelength of the light (7a) to be measured.

6. The interferometric device as defined in claim 1, wherein 100×100 interferometers are arranged in a square array.

7. The interferometric device as defined in claim 1, further comprising an image intensifier (10) mounted between the rectangular array of interferometers and the photodetector array (9).

8. An interferometric device for performing spectroscopic measurements based on interferometric principles, said device comprising a plurality of interferometers, each of said interferometers consisting of two partially transparent parallel mirrors, and said interferometers being arranged in a rectangular array so that a distance between the two parallel mirrors of each of said interferometers is unique and so that a plurality of different phase relationships of reflection are present within the array for each wavelength of light (7a) to be measured;

an array (9) of photodetectors positioned behind said rectangular array of the interferometers to produce output signals from the light (7a) to be measured; and means for transforming the output signals from the photodetector array to produce a spectrum;

wherein the plurality of interferometers comprises two parallel plates (12,13), and both sides (14,15) of a first (12) of the two parallel plates and a remote side (16) of a second (13) of the two parallel plates are flat, while a facing side of the second (13) parallel plate facing the first parallel plate is provided with steps (17) of identical height arranged in rows extending between two opposing narrow sides (18,19) so that a last of the steps adjacent to one (18) of the narrow sides in one of the rows follows a first of the steps (17) adjacent to the other (19) of the opposing narrow sides in a preceding row.

9. The interferometric device as defined in claim 8, wherein the plates (12,13) are made of glass, quartz or polymethylmethacrylate.

10. The interferometric device as defined in claim 9, wherein the two sides of the plates (12,13) facing each other are reflectively coated so as to form partially transparent mirrors for the light (7a) to be measured.

11. The interferometric device as defined in claim 8, wherein the step height of the steps (17) is less than or equal to a quarter of a shortest wavelength of the light (7a) to be measured.

12. The interferometric device as defined in claim 8, wherein 100×100 interferometers are arranged in a square array.

13. The inteferometric device as defined in claim 8, further comprising an image intensifier (10) mounted between the array of interferometers and the photodetector array (9).

* * * * *